March 6, 1962
R. C. HUDSON ET AL
3,023,969
MOBILE SPRAYING DEVICE
Filed March 6, 1959
2 Sheets-Sheet 1
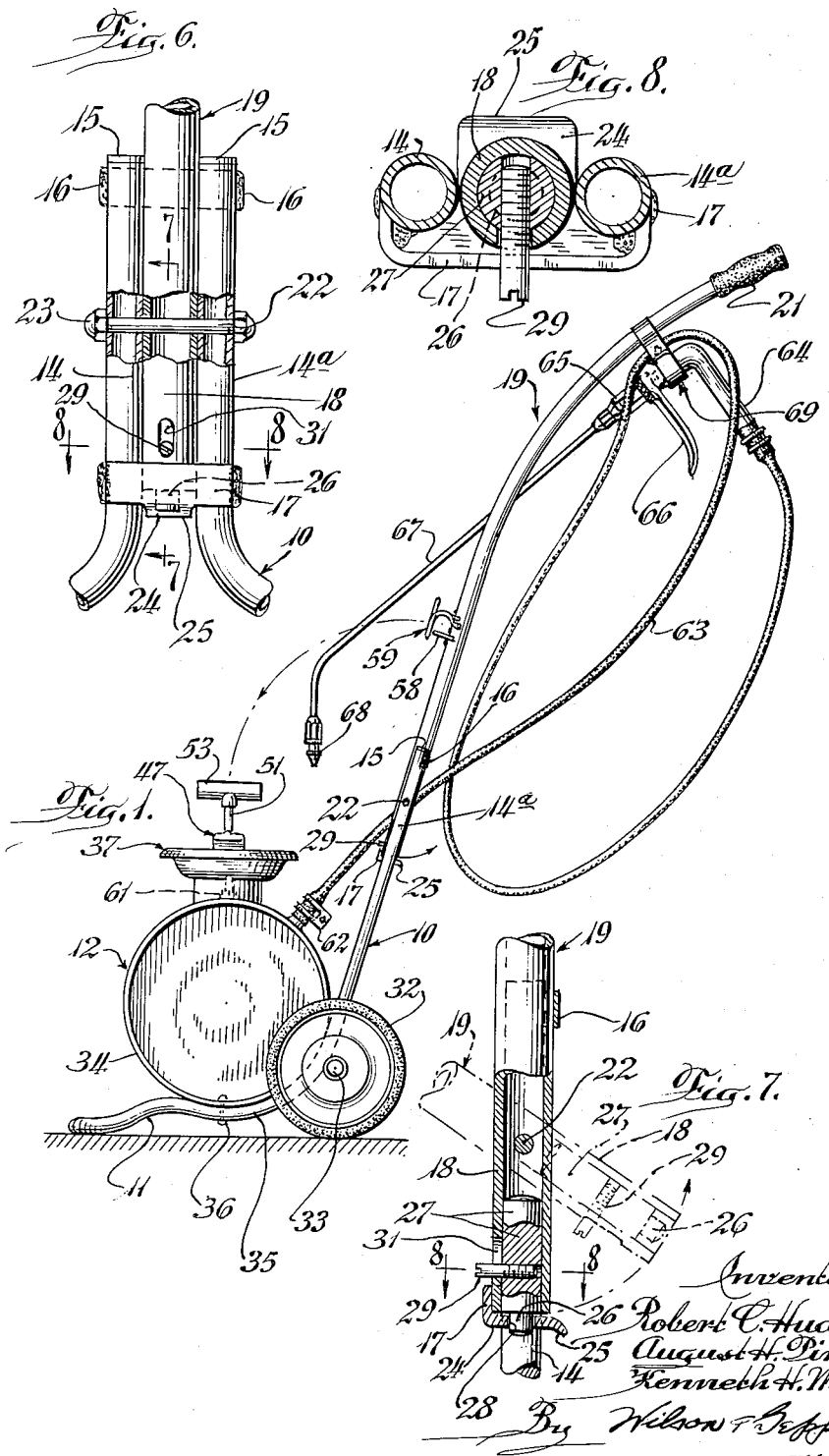

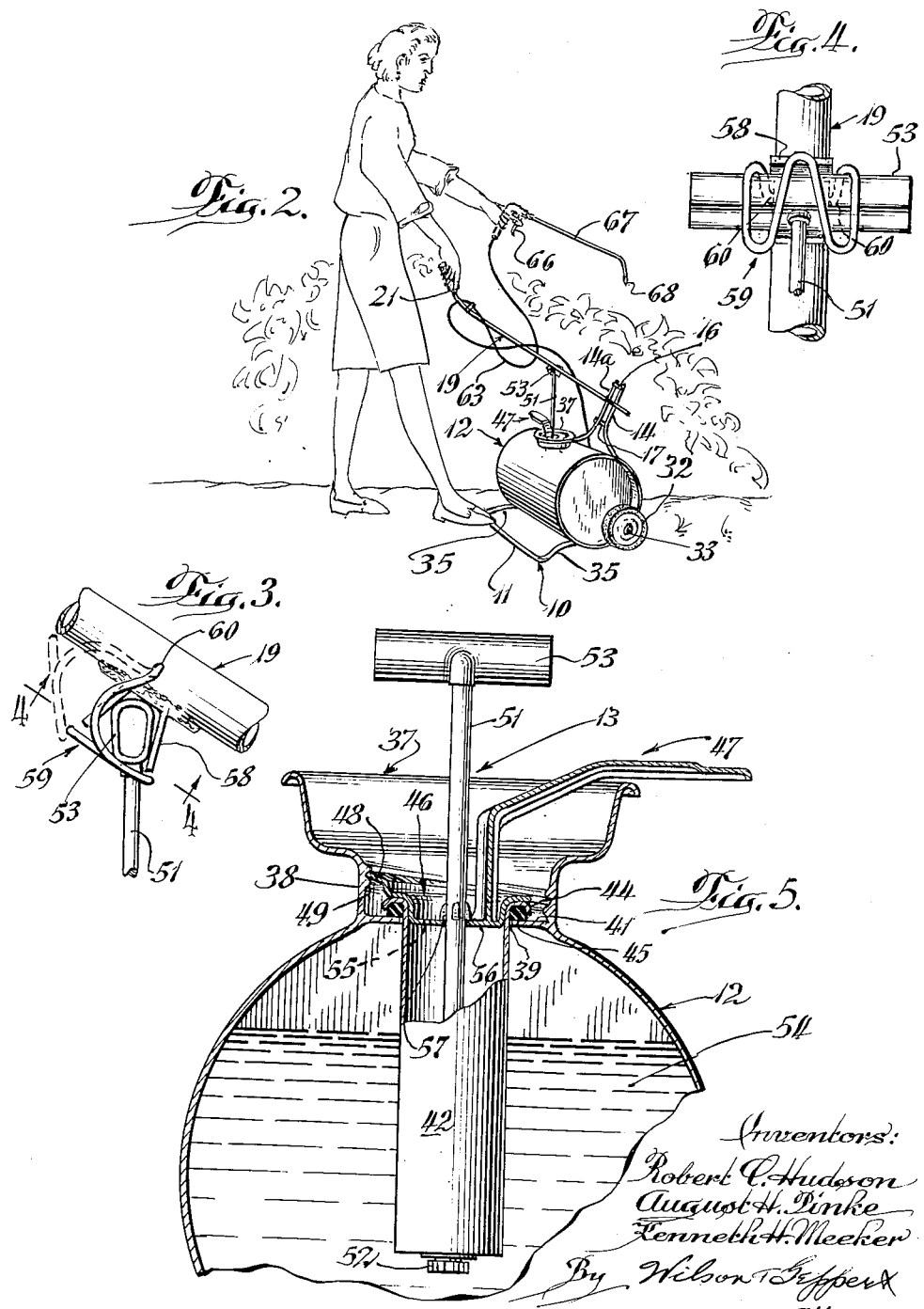

United States Patent Office 3,023,969
Patented Mar. 6, 1962

3,023,969
MOBILE SPRAYING DEVICE
Robert C. Hudson, Glencoe, Ill., and August H. Pinke and Kenneth H. Meeker, Hastings, Minn., assignors to H. D. Hudson Manufacturing Company, Chicago, Ill., a corporation of Minnesota
Filed Mar. 6, 1959, Ser. No. 797,770
5 Claims. (Cl. 239—146)

The present invention relates to a novel mobile or wheeled spraying device capable of readily and easily pumping and spraying any sprayable solution, including pesticides, insecticides, weed killers, whitewash, and any other agricultural, commercial or industrial chemicals.

Among the objects of the present invention is the provision of a novel portable or mobile spraying unit having a wheeled frame that may be easily and conveniently moved about by the operator during the spraying operation.

Another important object of the present invention is the provision of a wheeled sprayer having a pivotally mounted handle movable from its position for moving the sprayer about, to a position in which this handle functions as a lever for manipulating the pump plunger whereby to generate pressure in the tank.

In this novel embodiment, the handle for moving the sprayer is provided with a pivotal mounting and novel locking means for retaining the handle rigidly in position for readily and easily pulling or pushing the sprayer about and when released the pivotally mounted handle is readily connected by a novel locking clip to the handle grip of the pump plunger whereby this handle is capable of most effectively and easily actuating the plunger in the pumping operation.

The present invention further comprehends the provision of a novel detachable locking pin on the handle for the mobile frame unit or cart carrying the sprayer tank whereby this handle may be readily converted from a handle capable of pulling or pushing and guiding the sprayer unit about to a pivoted lever for connection to and actuating the pump plunger as the handle is manipulated to generate pressure in the tank. This pumping operation is readily and easily accomplished by the operator in a standing position whereby the usual tedious pumping operation may be more readily, conveniently and easily performed and, when the pumping operation has been completed, return of the handle to its normal operating position for pulling or pushing the sprayer about causes the locking pin to automatically lock the handle to the frame.

Another feature of the present invention is the provision of a novel means and manner of sealing the pump in the tank, including a pump gasket providing a pressure seal from the outside diameter of the gasket whereby to assure sealing at a minimum of pressure and without special effort in the assembly of the pump in the fill opening.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a view in side elevation of the novel mobile spraying device when not in use.

FIG. 2 is a view in perspective showing the handle tilted and engaging the pump plunger for pumping air into the tank by manipulating the handle up and down.

FIG. 3 is a fragmentary enlarged view showing an intermediate portion of the handle of the mobile sprayer and its connection to the handle grip of the pump for pumping air into the tank to thereby generate pressure required for spraying.

FIG. 4 is a fragmentary enlarged bottom plan view of the portion of the assembly shown in FIG. 3, the view being taken on substantially the line 4—4 of FIG. 3 and viewed in the direction of the arrows.

FIG. 5 is a fragmentary enlarged view, part in vertical cross section and part in side elevation, showing the manner of mounting the pump assembly in the access or fill opening of the tank and the means for sealing this opening against the escape of air from the tank.

FIG. 6 is a fragmentary enlarged view in front elevation of the lower end of the handle and the manner of pivotally connecting this handle to the spaced tubular extensions of the frame, a portion being broken away to show the pivotal mounting for the handle.

FIG. 7 is a fragmentary enlarged view part in vertical cross section and part in side elevation, the cross section being taken substantially on the line 7—7 of FIG. 6 and viewed in the direction of the arrows.

FIG. 8 is an enlarged view in horizontal cross section taken substantially on the line 8—8 of FIGS. 6 and 7, and viewed in the direction of the arrows.

Referring more particularly to the disclosure in the drawings and to the illustrative embodiment shown, the novel mobile spraying device comprises a frame 10 formed of a tubular rod providing a substantially U-shaped base 11 upon which a sprayer tank 12 is horizontally mounted, the base having a forward extension or ground engaging part for supporting the assembly when not in use as in FIG. 1, or when the pump 13 is operated to supply the tank with air under pressure as in FIG. 2, this extension is adapted to be engaged by a foot of the user to retain the frame and tank against movement upon the ground.

The frame 10 is provided with rearwardly and upwardly projecting tubular extensions 14 and 14a each closed at its upper end by a cap 15, the extensions provided with spaced conecting cross braces 16 and 17 to retain these extensions spaced apart to conformably receive therebetween the lower end 18 of an operating handle 19, the latter provided at its upper end with a hand grip 21 of natural or compounded synthetic rubber. This handle 19 is also formed of a tubular rod and adjacent its lower end is pivotally connected to the extensions 14 and 14a by a cross pin 22 having its opposite ends threaded to receive a cap nut 23.

The cross braces or bars 16 and 17 are preferably welded or otherwise rigidly connected at their ends to the extensions 14 and 14a, with the lower brace provided at its lower end with a rearwardly projecting tongue 24 having a down-turned lip 25 for guiding and forcing upwardly and inwardly a depending locking pin 26 carried on a plunger 27 slidably mounted in the lower end 18 of the handle 19. This locking pin 26 is adapted to be conformably received in an opening 28 in the tongue 24 to lock the lower end 18 of the handle 19 against pivotal movement on its cross pin 22, with the plunger 27 and its locking pin 26 being movable by means of a set screw or pin 29 projecting laterally from the plunger 27 through an elongated, vertically-extending slot 31 in the lower end of the handle 19.

When the handle 19 is moved to its upright position as shown in FIGS. 1, 6, 7 and 8 and the pin 29 is depressed to lower the locking pin 26 into its aligned opening 28, the handle 19 is rigidly supported by transverse braces 16 and 17 and connected to the extensions 14 and 14a of the frame, whereby the spraying device may be readily pushed or pulled about on its rubber-tired, ground-engaging wheels 32 rotatably mounted or journalled on the ends of an axle 33 positioned beyond but closely adjacent the flanged ends 34 of the tank 12. This axle is welded or securely mounted inwardly of the wheels 32 upon the spaced sides 35 of the frame 10 with the flanged ends 34 of the tank detachably mounted upon the frame sides 35 by cap screws 36 or other suitable attaching means.

The tank 12 is provided with a large upwardly and outwardly flared funnel 37 provided with a neck 38 and a fill opening 39 defined by an internal flange 41, the opening being adapted to conformably receive the barrel or cylinder 42 of the pump assembly 13. The pump assembly may be readily removed or inserted with its pump cylinder depending through the fill opening 39. This cylinder 42 is provided at its upper open end with an annular, outwardly and downwardly turned flange 44 receiving an annular gasket 45 having sealing engagement with the internal flange 41 of the tank 12 when the cover or closure 46 of the pump is rotated to compress the gasket into sealing engagement about the fill opening by an offset handle 47 affixed to the cover 46.

Sealing of the pump is effected by providing the outer circumference of the cover with a pair of inclined camming surfaces 48, the periphery of these camming surfaces adapted to ride over two vertically spaced, inclined and interrupted threads 49 in the neck 38 to provide a tight locking and sealing engagement when the handle 47 is rotated in a clockwise direction with the camming surfaces riding over and engaging beneath the lower interrupted threads 49 as shown in FIG. 5.

The pump is provided with a plunger or piston rod 51 carrying at its lower end the usual piston (not shown) and with a suitable check valve 52 at the lower end of the pump cylinder to permit the discharge of air upon the downstroke of the pump piston into the tank 12 when the plunger rod 51 is depressed through manipulation of its handle 53 to build up pressure in the tank, and prevent the reverse flow or escape of the air or spray solution 54 from the tank 12 into and out of the pump cylinder 42.

Air may enter the pump cylinder 42 from the exterior about the opening in the cover through which projects the plunger rod 51 and also through one or more openings 55 provided in the depending portion 56 of the cover 46. Embossements 57 on the plunger rod 51 limit the downward movement of this rod in the pumping operation.

The handle 19 is provided on the normally upper side thereof intermediate its length with a substantially U-shaped bracket 58 adapted to loosely receive therein the T-shaped handle grip 53 of the pump plunger when the handle is released and tilted forwardly about its pivotal connection 22, and is also provided with a locking clip 59 composed of a length of wire bent to provide a substantially W-shaped clip with its opposite ends 60 pivotally mounted in openings in the handle at the opposite sides of the bracket 58. Thus when the locking pin 26 is elevated and released and the handle 19 pivoted forwardly about its pivotal connection or cross pin 22 from the position of FIG. 1 to the position shown in FIG. 2, the handle grip 53 of the piston rod enters the bracket 58, whereupon the locking clip 59 is moved over and locks the handle grip 53 to the handle 19 of the mobile unit as shown in FIGS. 3 and 4.

The bracket 58 and the locking clip 59 are so constructed and arranged as to permit limited movement of the handle grip 53 (FIG. 3) as the handle 19 is actuated as a lever and freely manipulates the pump.

The tank 12 is provided with a safety or relief valve 61 for relieving excess pressure generated in the tank with this valve audibly informing the operator when a predetermined pressure has been generated.

The spray solution 54 under pressure in the tank 12 exits from the bottom of the tank through an outlet nipple 62 connected to one end of a section of hose or flexible tubing 63 of any desired length. The other end of this flexible tubing is connected to a rigid hand grip 64 provided with a control valve 65 having a piston grip 66 for actuating the valve, and a rigid extension 67 having a curved end portion provided with a multi-spray nozzle 68 adjustable to any conical spray pattern from a fine atomized spray to a long range stream of the discharged spray solution. When the sprayer is not in use, the hand or pistol grip 66 is adapted to be mounted upon a clip or bracket 69 carried on the upper portion of the handle 19 adjacent its hand grip 21.

From the above description and the disclosure in the drawings, it will be apparent that the present invention comprehends a novel portable sprayer that can be readily moved about either by pushing or pulling on the handle 19, and one which affords maximum ease in pumping and handling. As shown in FIG. 2, the operator can readily and easily manipulate the handle 19 as a lever to actuate the pump from an erect position, and when sufficient pressure has been generated return of the handle 19 to its upright position automatically locks this handle in position to move the sprayer freely about on its cushioned wheels.

The effective overall width of the novel sprayer assembly is such that but little room is required for storage, and when moved about for spraying requires but a narrow path.

Having thus disclosed the invention, we claim:

1. A mobile sprayer comprising a horizontally disposed tank having a pump provided with a plunger having a handle grip for operating the plunger, a wheeled frame having spaced sides carrying the opposite ends of the tank and a part projecting forwardly of said tank and adapted to support the sprayer when not in use, said frame provided with spaced rearwardly and upwardly projecting extensions, a handle conformably received and pivotally mounted between said extensions for moving the sprayer about on its wheeled support, means for locking said handle to said extensions whereby the mobile sprayer may be pulled or pushed about by said handle, and means detachably connecting said handle to said pump handle grip when said first mentioned locking means is released and said handle is moved to its pivoted position.

2. A mobile sprayer comprising a horizontally disposed tank having a pump provided with a plunger having a handle grip for operating the plunger, a wheeled frame having spaced sides carrying the opposite ends of the tank and a part projecting forwardly of said tank and adapted to support the sprayer when not in use, said frame provided with spaced rearwardly and upwardly projecting extensions, a handle conformably received and pivotally mounted between said extensions, means for locking said handle to said extensions whereby the mobile sprayer may be pulled or pushed about by said handle, and a locking clip provided intermediate the length of said handle, whereupon release of said locking means and tilting of the handle forwardly about its pivot aligns the locking clip with the handle grip of the pump plunger and upon locking of said clip to the handle grip movement of the handle up and down actuates the pump plunger and generates pressure in the tank.

3. A mobile sprayer comprising a horizontally disposed tank having a pump provided with a plunger for generating pressure in said tank, a wheeled frame carrying said tank, a handle pivotally mounted adjacent one end on said frame, locking means for locking said handle against pivotal movement and holding it rigid for pushing or pulling said sprayer about on its wheeled support by said handle, means for releasing said handle from locking position whereupon it is free to move about its pivotal mounting with the handle projecting over the pump and means on said handle for detachably engaging and actuating the plunger by movement of the handle.

4. In a mobile sprayer, a tank for receiving a spray solution and provided with a pump having a reciprocating plunger rod projecting above the tank for generating pressure in the tank, a wheeled frame having a base provided with spaced sides carrying the ends of the tank and rearwardly and upwardly extending projections, a handle having one end conformably received between and in alignment with said projections, means for pivotally connecting said one end of the handle between said projections, means for detachably locking said end of the handle to said projections and having means for releasing said locking means to permit tilting of said handle forwardly about its pivot, means on said handle for locking said handle to the plunger rod whereby said handle may be rocked up and down about its pivot as a fulcrum and reciprocate said plunger to supply the tank with air under pressure.

5. In a mobile sprayer, a wheeled supporting frame of tubular construction having a base, a spray tank supported on said base, a pump in said tank having a plunger rod and a handle grip projecting above said tank, said base having a forwardly projecting part for supporting the sprayer in upright position when not in use and when said pump is operated, a handle having its lower end pivotally mounted on said frame, means for locking the lower end of said handle to said frame, said handle when said locking means is released being tiltable forwardly and provided with means for engaging the handle grip of said plunger rod whereby the pivotally mounted handle operates as a lever to manipulate the plunger rod and supply the tank with air under pressure.

References Cited in the file of this patent

UNITED STATES PATENTS

| | | |
|---|---|---|
| 983,346 | Burdick | Feb. 7, 1911 |
| 1,738,096 | Cole | Dec. 3, 1929 |
| 1,815,825 | Bates | July 21, 1931 |
| 2,188,682 | Goetz | Jan. 30, 1940 |
| 2,609,973 | Bullock | Sept. 9, 1952 |
| 2,748,992 | Pinke | June 5, 1956 |
| 2,818,299 | Payne | Dec. 31, 1957 |
| 2,883,115 | Converse | Apr. 21, 1959 |